US008499882B2

(12) United States Patent
Tsumiyama et al.

(10) Patent No.: US 8,499,882 B2
(45) Date of Patent: Aug. 6, 2013

(54) UTILITY VEHICLE

(75) Inventors: Yoshinori Tsumiyama, Lincoln, NE (US); Hidetoshi Kaku, Lincoln, NE (US); Tyler Furman, Raymond, NE (US); Kazuhiro Maeda, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 249 days.

(21) Appl. No.: 12/980,215

(22) Filed: Dec. 28, 2010

(65) Prior Publication Data

US 2012/0160589 A1    Jun. 28, 2012

(51) Int. Cl.
*B60K 5/00* (2006.01)
*B60K 5/10* (2006.01)
*B62D 21/00* (2006.01)

(52) U.S. Cl.
USPC ........... 180/311; 180/312; 280/796; 280/798; 296/205

(58) Field of Classification Search
USPC .............. 280/796, 798; 180/311, 312, 89.17, 180/89.18, 89.13, 89.11; 296/205
See application file for complete search history.

(56) References Cited

U.S. PATENT DOCUMENTS

| 4,785,900 | A* | 11/1988 | Nasky | 180/89.14 |
| 7,677,343 | B2* | 3/2010 | Kitai et al. | 180/89.17 |
| 7,874,606 | B2* | 1/2011 | Yamamura et al. | 296/64 |
| 7,926,862 | B2* | 4/2011 | Smith et al. | 296/64 |
| 2008/0100098 | A1* | 5/2008 | Kobayashi et al. | 296/204 |
| 2009/0183938 | A1* | 7/2009 | Cover et al. | 180/291 |
| 2010/0314191 | A1* | 12/2010 | Deckard et al. | 180/312 |

FOREIGN PATENT DOCUMENTS

JP    2007-276703 A    10/2007

* cited by examiner

*Primary Examiner* — Joseph Rocca
*Assistant Examiner* — George Spisich
(74) *Attorney, Agent, or Firm* — Alleman Hall McCoy Russell & Tuttle LLP

(57) ABSTRACT

A utility vehicle comprises a vehicle body frame including a main frame including a floor member and a pair of right and left side members and a sub-frame for reinforcing the main frame, each of the side members includes a side pipe element, a first pillar pipe element, a second pillar pipe element and a third pillar pipe element, the sub-frame includes a first cross member provided between and coupled to second pillar pipe elements, one end portion of the first cross member is detachably coupled to one of the second pillar pipe elements and an opposite end portion of the first cross member is detachably attached to the other second pillar pipe element.

9 Claims, 15 Drawing Sheets

UTILITY VEHICLE

BACKGROUND OF THE INVENTION

1. Field of the Invention

The present invention relates to a utility vehicle including a vehicle body frame including a main frame and a sub-frame for reinforcing the main frame.

2. Description of the Related Art

Typically, in utility vehicles, an engine is mounted to a center portion of a vehicle body frame, and pipe members constituting the vehicle body frame are arranged to cover the engine. In this construction, when an operator carries out maintenance of the engine, the operator cannot easily access the engine, which makes it difficult for the operator to carry out a maintenance operation efficiently.

Under the circumstances, techniques for enabling the operator to easily access the engine have been developed. One example of these techniques is disclosed in Japanese Laid-Open Patent Application Publication No. 2007-276703. In the prior art disclosed in this publication, since a seat support frame of a vehicle body frame, which is disposed in the vicinity of the engine, is displaceable, the operator can easily access the engine to maintain the engine by displacing the seat support frame. In this technique, however, because of a complex structure of the seat support frame, a cost of the seat support frame increases. Under the circumstances, it is desirable to provide a simple and inexpensive configuration for enabling the operator to easily access the engine.

SUMMARY OF THE INVENTION

A utility vehicle of the present invention comprises a vehicle body frame including a main frame including a floor member, which receives a load of an engine, a pair of right and left side members provided integrally at both side portions of the floor member in a rightward and leftward direction, and a sub-frame for reinforcing the main frame, each of the pair of side members including a side pipe element extending in a forward and rearward direction at a side portion of the floor member in the rightward and leftward direction, a first pillar pipe element, a second pillar pipe element, and a third pillar element, the first pillar pipe element, the second pillar pipe element, and the third pillar element extending upward from the side pipe element such that the first pillar pipe element, the second pillar pipe element, and the third pillar element are spaced apart from each other in the forward and rearward direction, the sub-frame including a first cross member provided between and coupled to the second pillar pipe element in a middle location in each of the pair of side members, and one end portion of the first cross member being detachably coupled to one of the second pillar pipe elements and an opposite end portion of the first cross member being detachably coupled to the other of the second pillar pipe elements.

In such a configuration, the sub-frame can be detached from the main frame by separating the both end portions of the first cross member from the second pillar pipe elements. By detaching the sub-frame from the main frame, a space can be provided in the vicinity of the engine mounted on the main frame. Therefore, the engine can be mounted to the main frame easily and efficiently, and the engine can be maintained easily and efficiently. In addition, the main frame can be reinforced by the sub-frame.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in a utility vehicle.

Figure 1:
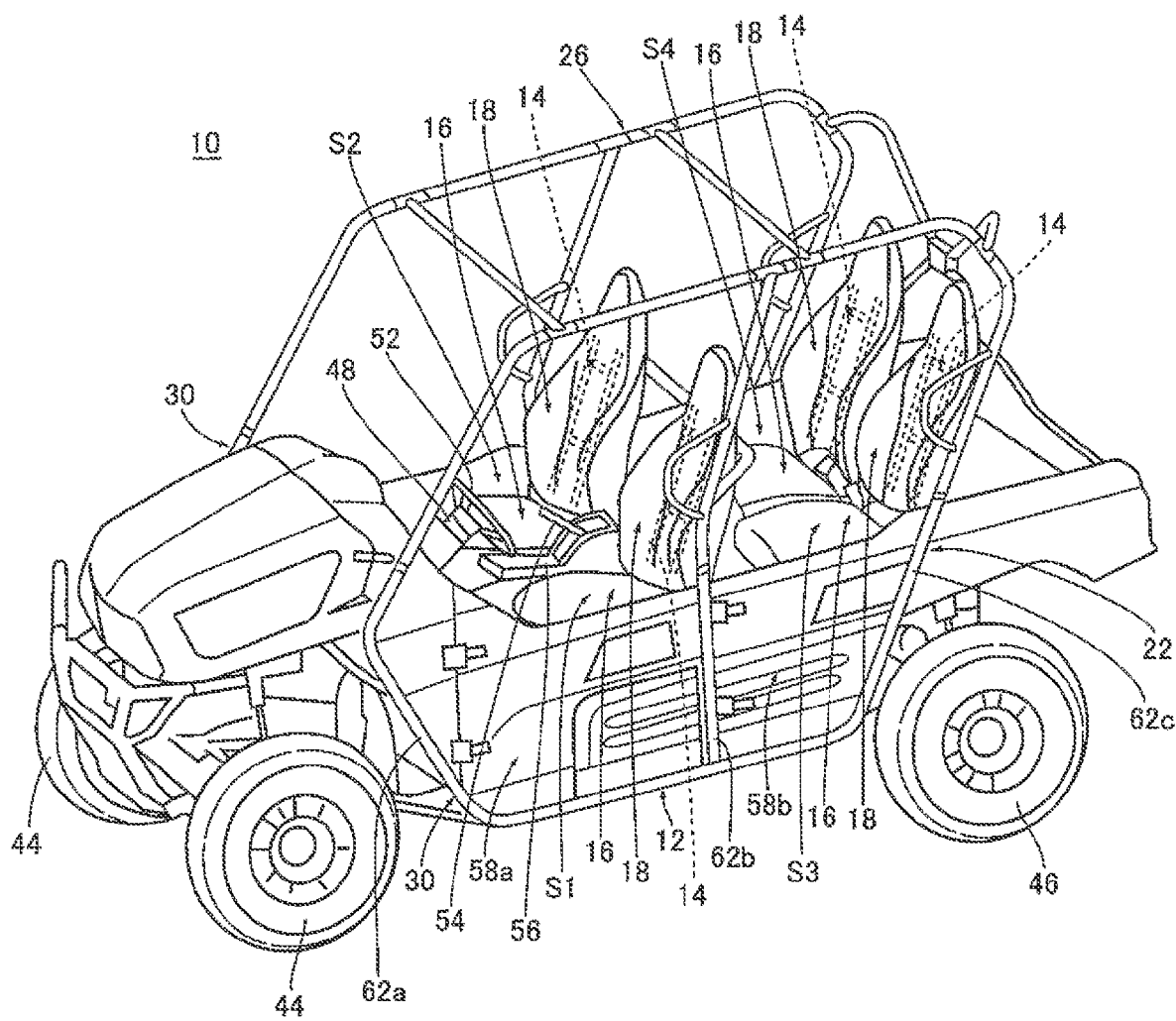
FIG. 1 is a perspective view showing an external appearance of a utility vehicle according to Embodiment 1.
Figure 2:
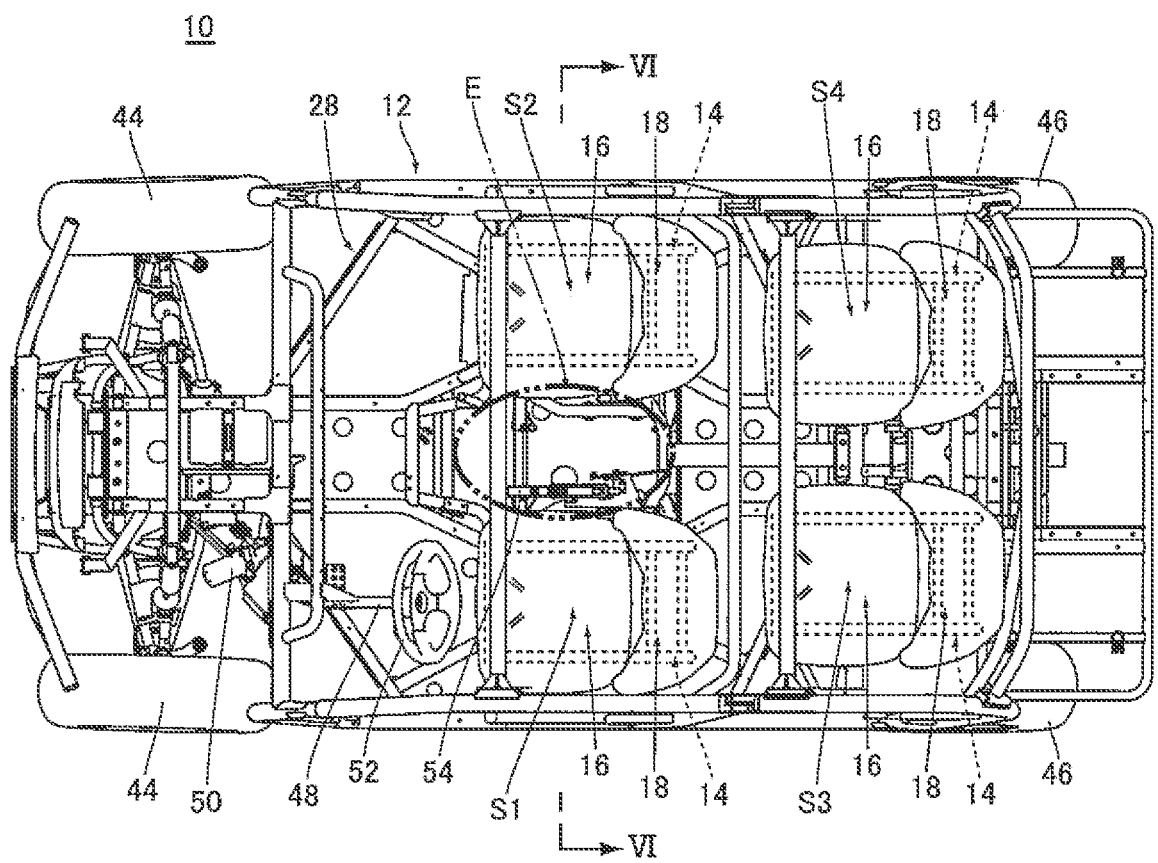
FIG. 2 is a plan view showing a construction of the utility vehicle according to Embodiment 1.
Figure 3:
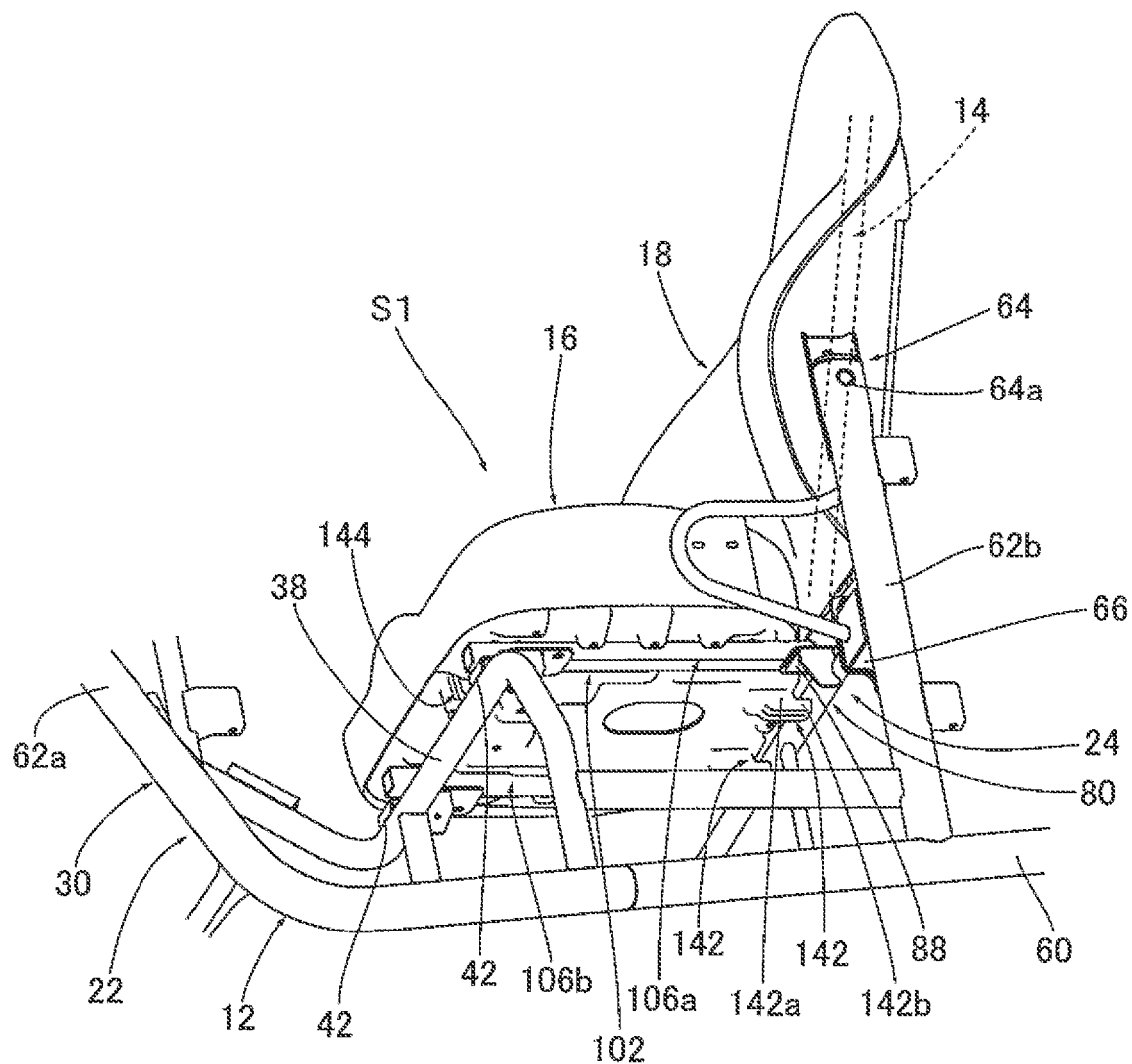
FIG. 3 is a perspective view showing a state where a seat is mounted to a vehicle body frame, as viewed obliquely from below.

FIG. 1 is a perspective view showing an external appearance of a utility vehicle 10 according to Embodiment 1. FIG. 2 is a plan view showing a configuration of the utility vehicle 10. FIG. 3 is a perspective view showing a state where a seat S1 is mounted to a vehicle body frame 12, as viewed from obliquely downward.

Referring to FIGS. 1 to 3, the utility vehicle 10 includes the vehicle body frame 12, four seat frames 14 mounted to the vehicle body frame 12, seat bottoms 16 mounted to the four seat frames 14, respectively, and seat backrests 18 mounted to the four seat frames 14, respectively. Each of the four independent seats S1 to S4 includes the seat frame 14, the seat bottom 16 and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat S1, located at the front side and at the left side, is a driver seat.

Figure 4:
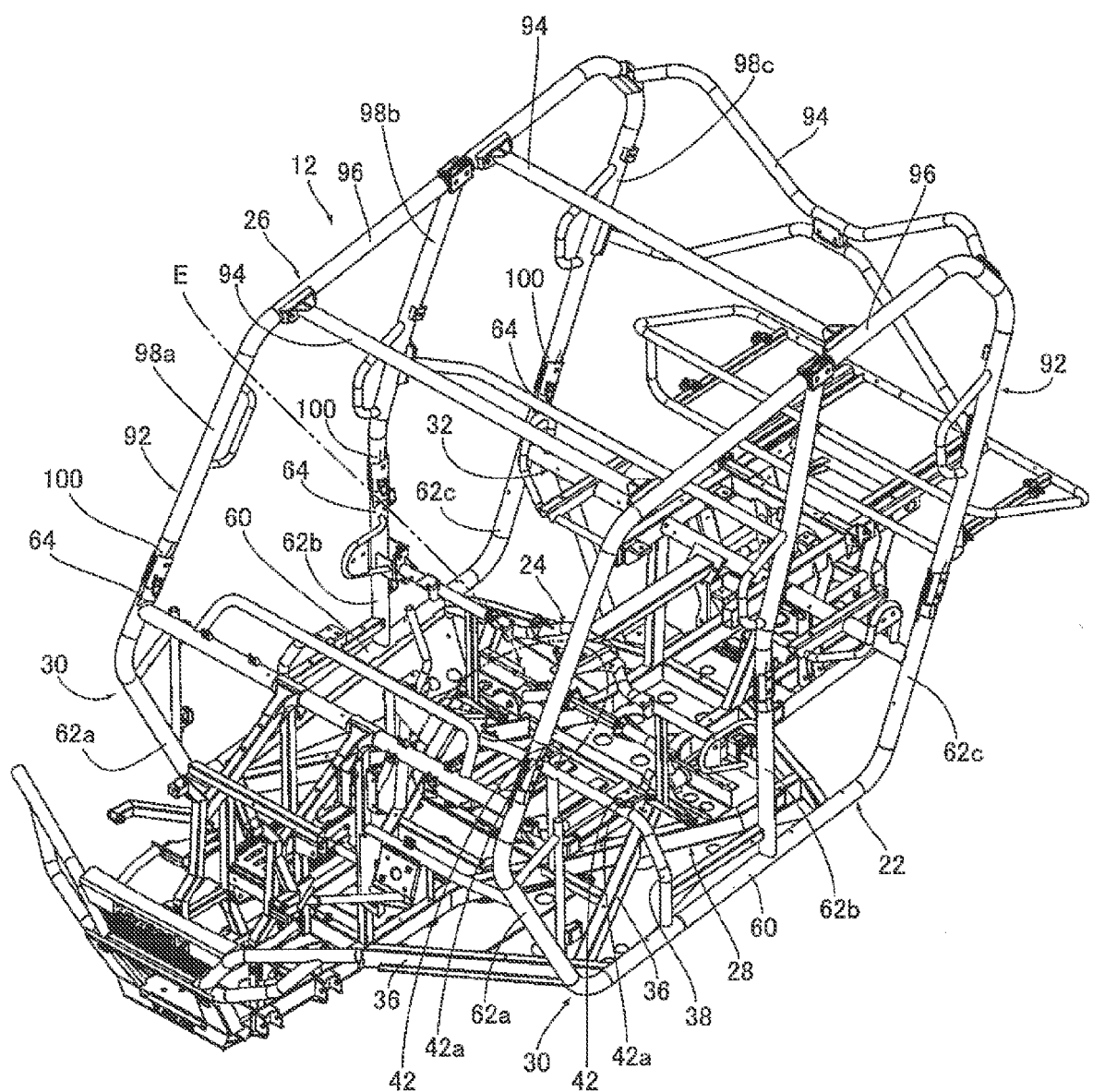
FIG. 4 is a perspective view showing a configuration of the vehicle body frame.
Figure 5:
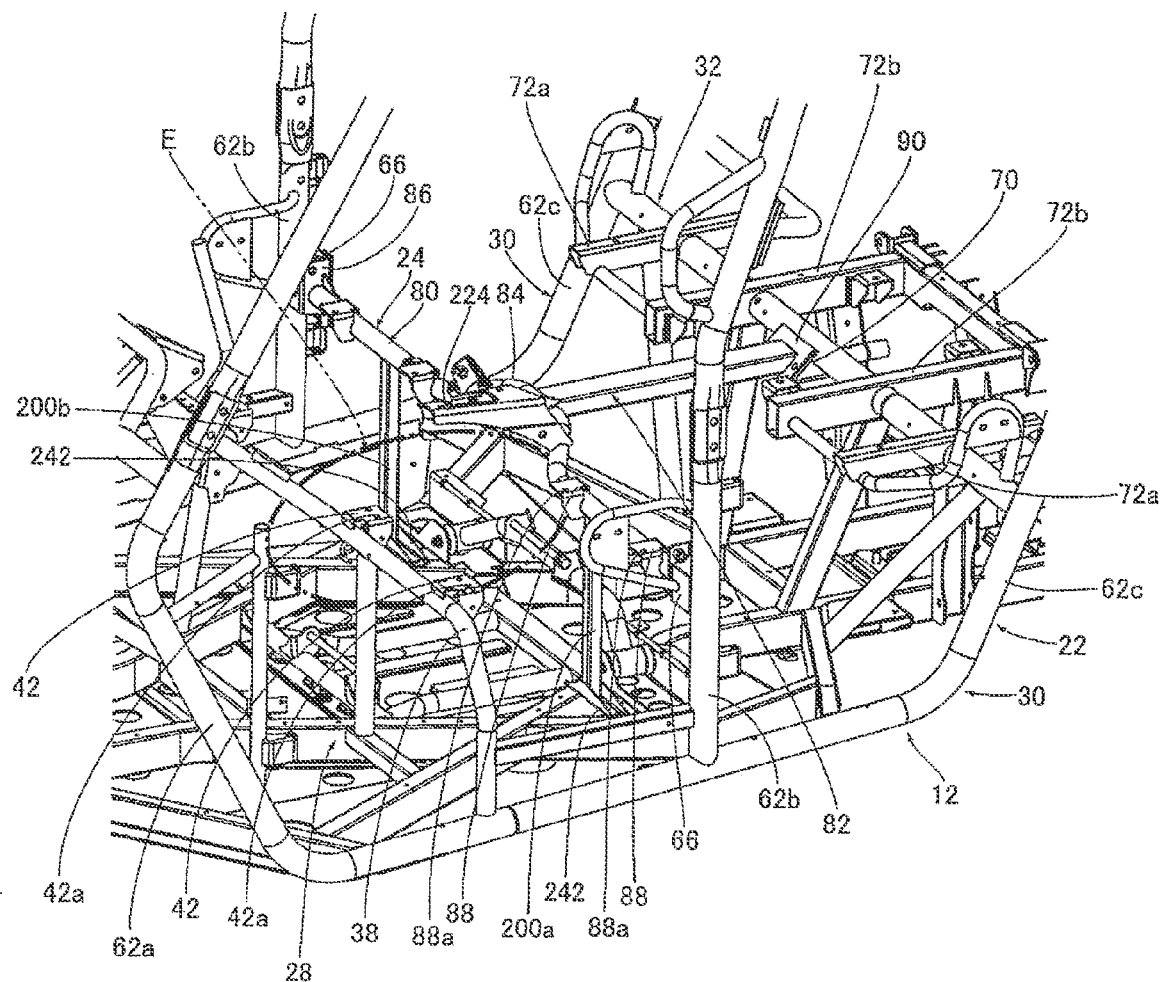
FIG. 5 is a perspective view showing a configuration of a part of the vehicle body frame.
Figure 6:
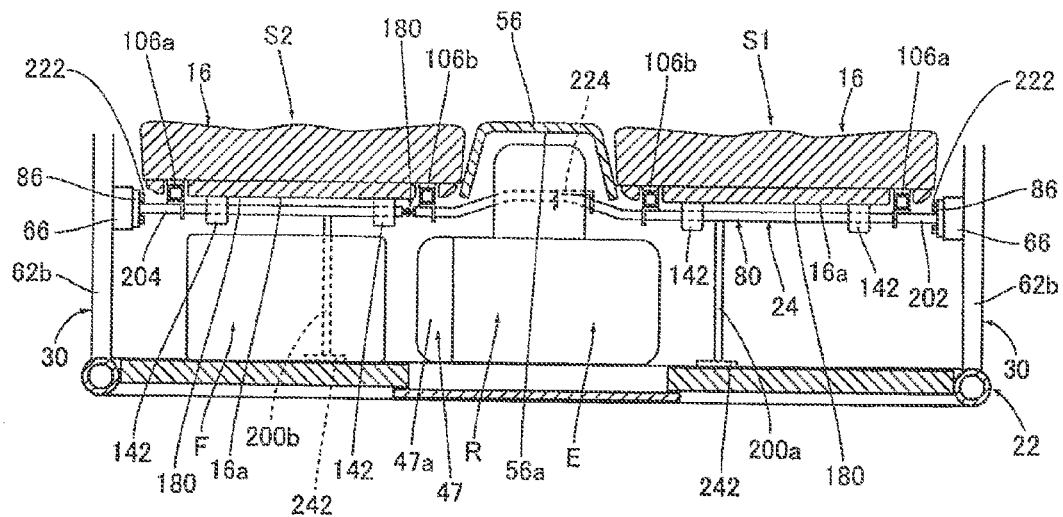
FIG. 6 is a cross-sectional view taken along line VI-VI in FIG. 2.

FIG. 4 is a perspective view showing a configuration of the vehicle body frame 12. FIG. 5 is a perspective view showing a configuration of a part of the vehicle body frame 12. FIG. 6 is a cross-sectional view taken along line VI-VI in FIG. 2. As shown in FIG. 4, the vehicle body frame 12 includes a main frame 22, a sub-frame 24 (FIG. 5) for reinforcing the main frame 22, and a cabin frame (ROPS) 26.

As shown in FIG. 4, the main frame 22 includes a floor member 28 which is opposite to a road surface or a ground, a pair of side members 30 provided at side portions of a vehicle body in the rightward and leftward direction, and a second cross member 32 for coupling the side members 30 to each other.

As shown in FIG. 2, the floor member 28 is a base member configured to support the engine E and the four seats S1 to S4. As shown in FIG. 4, the floor member 28 is constructed in such a manner that a plurality of square pipes 36 with rectangular cross-sections, extending horizontally are welded to each other to form a unitary structure. At a portion of an upper surface of the floor member 28, corresponding to a front end portion of each of the seats S1 and S2, a substantially arch-shaped support pipe 38 is disposed to extend in the rightward and leftward direction and configured to support the seat frame 14. Each support pipe 38 is provided with two plates 42 arranged to be spaced apart from each other in the rightward and leftward direction. The plates 42 have holes 42a into which bolts 40 (FIG. 7) are inserted, respectively. Each of the two plates 42 has a flat upper surface.

As shown in FIG. 2, two front wheels 44 are suspended from the front portion of the floor member 28, two rear wheels 46 are suspended from the rear portion of the floor member 28, and an engine E is mounted at the center portion of the floor member 28. As shown in FIG. 6, a fuel tank F is disposed at one side (right side in this embodiment) of the engine E in the rightward and leftward direction. The engine E includes a CVT 47 (continuously variable transmission). A side surface of a cover 47a of the CVT 47 faces a side surface of the fuel tank F. As shown in FIG. 2, the four seats S1 to S4 are arranged above the floor member 28 at right and left sides and at front and rear sides. A steering shaft 48 is provided forward relative to the seat S1. An electric power steering device 50 is coupled to a lower end portion of the steering shaft 48. A handle 52 is coupled to an upper end portion of the steering shaft 48. A lever 54 of a parking brake is provided at a right side of the seat S1. As shown in FIG. 6, a console box 56 is disposed between the seats S1 and S2 to cover the engine E.

As shown in FIG. 1, each side member 30 is configured to support the cabin frame (ROPS) 26, a front door 58a, and a rear door 58b. As shown in FIG. 4, each side member 30 includes a side pipe element 60 extending in a forward and rearward direction at a side portion of the floor member 28 in the rightward and leftward direction, a first lower pillar pipe element 62a extending upward from a front end portion of the side pipe element 60, a second lower pillar pipe element 62b extending upward from a center portion of the side pipe element 60 in the forward and rearward direction, and a third lower pillar pipe element 62c extending upward from a rear end portion of the side pipe element 60. The side pipe element 60 and the lower pillar pipe elements 62a to 62c are round pipes having circular cross-sections. The side pipe element 60 is welded to the square pipe 36 of the floor member 28. As shown in FIG. 3, connecting portions 64 having holes 64a into which bolts are inserted are provided at upper end portions of the lower pillar pipe elements 62a to 62c, respectively. As shown in FIG. 5, a connecting portion 66 having a hole (not shown) into which a bolt 222 (FIG. 7) is inserted is provided at a vertical center portion of each second lower pillar pipe element 62b.

Figure 9A:
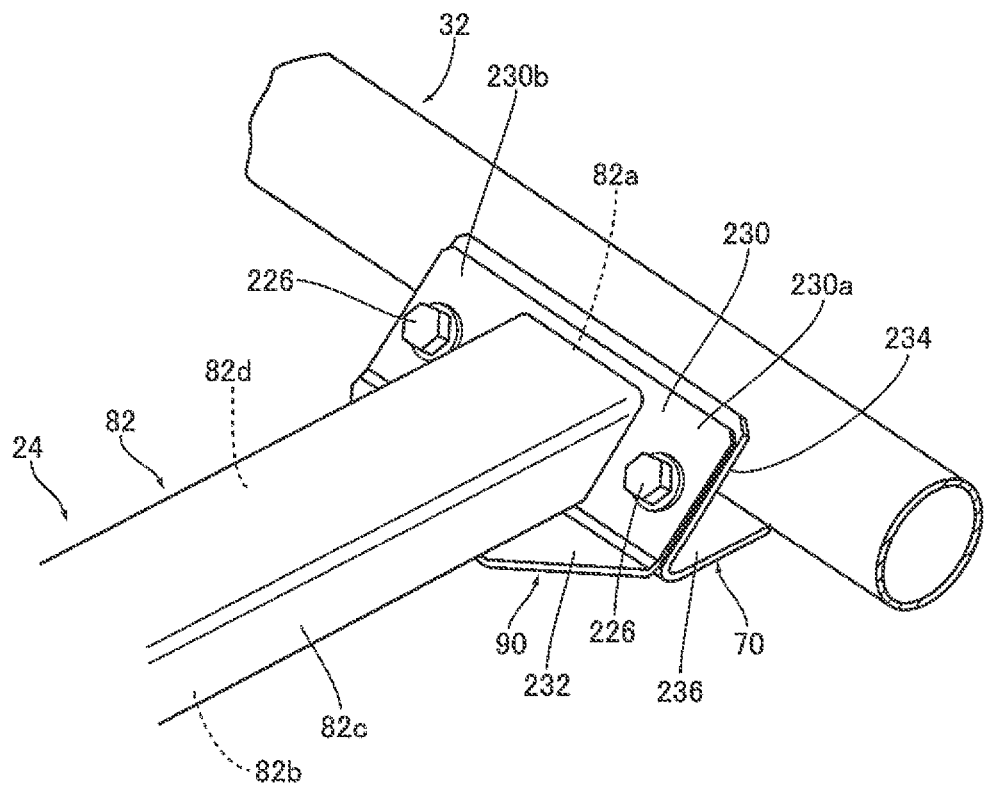
FIG. 9A is a perspective view showing a coupling structure for coupling a longitudinal member of the sub-frame to a second cross member of a main frame, when viewed obliquely from above.
Figure 9B:
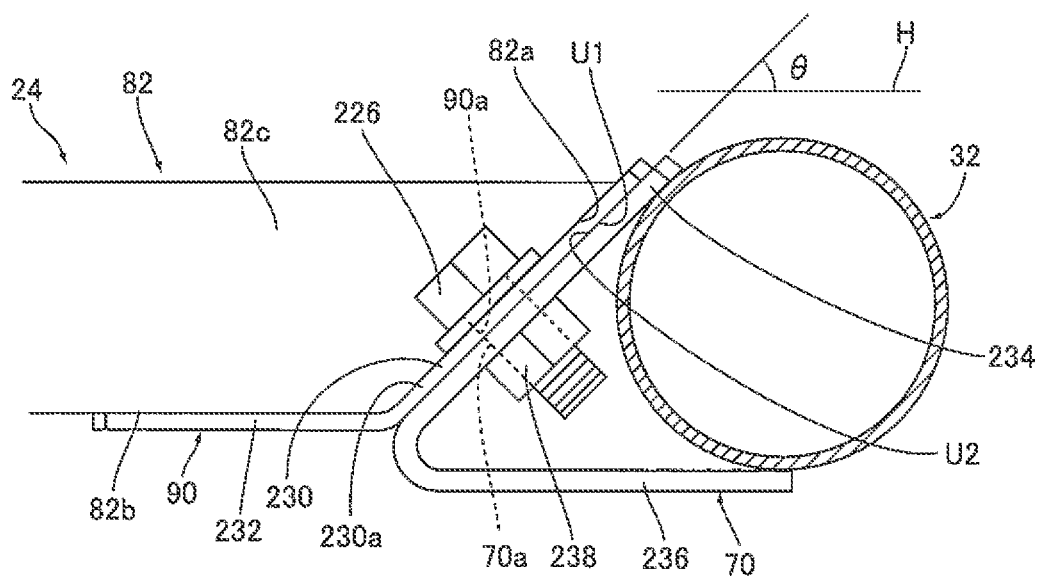
FIG. 9B is a left side view showing a coupling structure for coupling the longitudinal member of the sub-frame to the second cross member of the main frame.

As shown in FIG. 5, the second cross member 32 is a pipe member for coupling the third lower pillar pipe elements 62c of the pair of right and left side members 30 to each other. One end portion of the cross member 32 is welded to one of the third lower pillar pipe elements 62c, while an opposite end portion thereof is welded to the other third lower pillar pipe element 62c. As shown in FIGS. 9A and 9B, the cross member 32 is provided with a connecting element 70 having a hole 70a (FIG. 9B) into which a bolt 226 is inserted, at a center portion thereof in a longitudinal direction of the cross member 32. As shown in FIG. 5, two support pipes 72a and 72b extending in the forward and rearward direction are welded to portions of the cross member 32 respectively corresponding to the seats S3 and S4 (FIG. 2), to support the seat frame 14 (FIG. 2).

Figure 7:
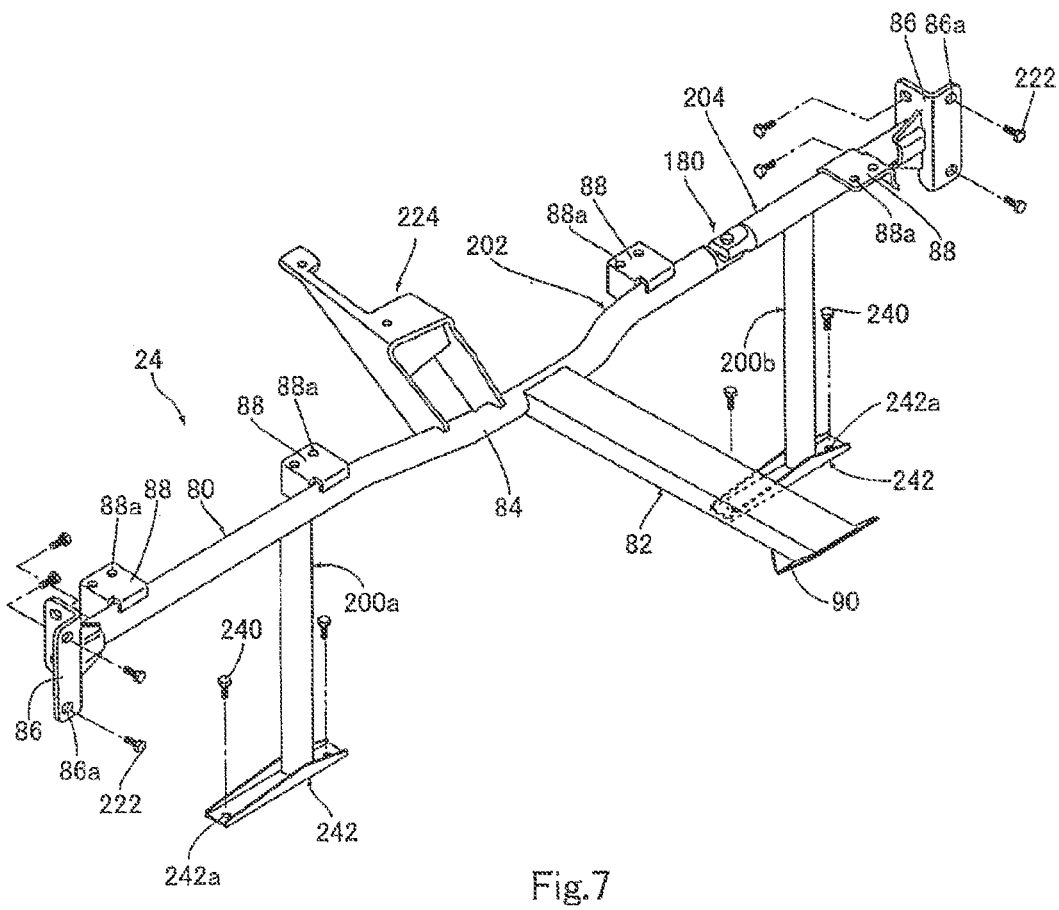
FIG. 7 is a perspective view showing a configuration of a sub-frame.
Figure 8:
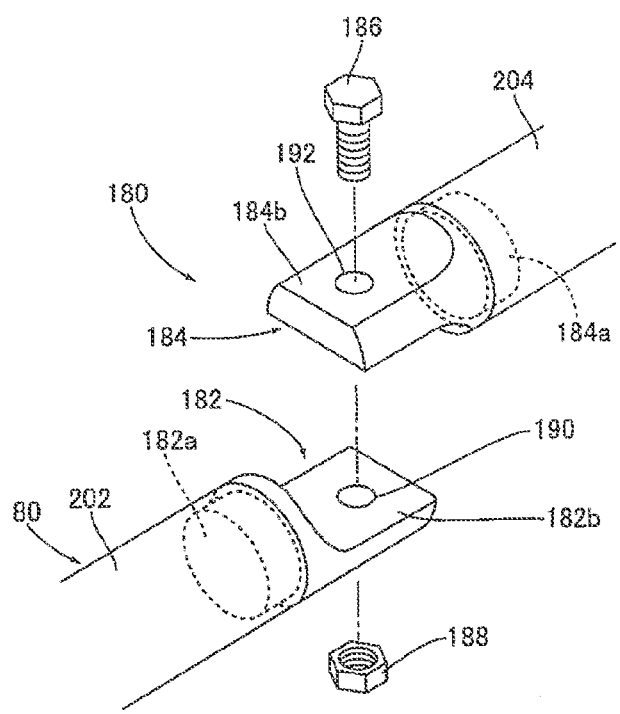
FIG. 8 is a perspective view showing a joint portion of the sub-frame.

FIG. 7 is a perspective view showing a configuration of the sub-frame 24. FIG. 8 is a perspective view showing a joint portion 180 of the sub-frame 24. FIG. 9A is a perspective view showing a coupling structure for coupling the longitudinal member 82 of the sub-frame 24 to the second cross member 32 of the main frame 22, when viewed from obliquely above. FIG. 9B is a left side view showing the coupling structure. As shown in FIG. 7, the sub-frame 24 includes a first cross member 80 extending in the rightward and leftward direction, a longitudinal member 82 provided behind the first cross member 80 to extend in the forward and rearward direction, and two leg elements 200a and 200b extending vertically below the first cross member 80.

As shown in FIG. 6, the first cross member 80 is a pipe member for coupling the second lower pillar pipe elements 62b in a middle location in the right and left side members 30, behind the seat bottom 16. As shown in FIG. 7, the first cross member 80 includes a pipe-shaped first portion 202 having a circular cross-section, a pipe-shaped second portion 204 having a circular cross-section, and a joint portion 180. By the joint portion 180, the first portion 202 and the second portion 204 are separably coupled to each other.

As shown in FIG. 8, the joint portion 180 includes a first connecting portion 182 attached to an end portion of the first portion 202 of the first cross member 80, a second connecting portion 184 attached to an end portion of the second portion 204 of the first cross member 80, and a bolt 186 and a nut 188 for fastening the first connecting portion 182 to the second connecting portion 184.

As shown in FIG. 8, the first connecting portion 182 includes a cylindrical first fitting portion 182a fitted to an interior of an end portion of the first portion 202, and a first protruding portion 182b formed integrally with the first fitting portion 182a and protruding from the end portion of the first portion 202 in a longitudinal direction of the first portion 202. The first protruding portion 182b has a first hole 190 into which a bolt 186 is inserted. When the first connecting portion 182 is mounted to the end portion of the first portion 202, the first fitting portion 182a is fitted to the interior of the end portion of the first portion 202 and then the first connecting portion 182 is firmly joined to the first portion 202 by welding, etc.

The second connecting portion 184 includes a cylindrical second fitting portion 184a fitted to an interior of an end portion of the second portion 204, and a plate-shaped second protruding portion 184b formed integrally with the second fitting portion 184a and protruding from the end portion of the second portion 204 in a longitudinal direction of the second portion 204. The second protruding portion 184b has a second hole 192 into which the bolt 186 is inserted. When the second connecting portion 184 is mounted to the end portion of the second portion 204, the second fitting portion 184a is fitted to the interior of the end portion of the second portion 204 and then the second connecting portion 184 is firmly joined to the second portion 204 by welding, etc.

When the first portion 202 is coupled to the second portion 204 using the joint portion 180, a lower surface of the second protruding portion 184b of the second connecting portion 184 is brought into contact with an upper surface of the first protruding portion 182b of the first connecting portion 182. Then, the bolt 186 is inserted into the first hole 190 and the second hole 192, and the nut 188 is threadingly engaged with the bolt 186.

As shown in FIG. 7, a bent portion 84 which is bent upward in an obliquely rearward direction is formed at a portion (in this embodiment, a part of the first portion 202) of the first cross member 80 which is located above the engine E such that the bent portion 84 is far away from the engine E (FIG. 6). Connecting portions 86 each having holes 86a into which the bolts 222 are inserted are provided at both end portions of the first cross member 80 in a longitudinal direction thereof. A bracket 224 is provided at a center portion of the first cross member 80 in a longitudinal direction thereof to support a lever 54 (FIG. 2) of a parking brake. Two plates 88, each having threaded holes 88a into which the bolts 40 (FIG. 10) are threaded, are provided at portions of the first cross member 80 to respectively correspond to rear end portions of the seats S1 and S2, such that the two plates 88 are spaced apart from each other in the rightward and leftward direction. By coupling the connecting portions 86 to the connecting portions 66 (FIG. 6) of the main frame 22 by the bolts 222, etc, both end portions of the first cross member 80 in the longitudinal direction thereof are detachably coupled to the second lower pillar pipe elements 62b, respectively.

As shown in FIG. 5, the longitudinal member 82 is a pipe-shaped member for coupling the first cross member 80 of the sub-frame 24 to the second cross member 32 of the main frame 22. As shown in FIGS. 9A and 9B, the longitudinal member 82 is constructed of a square pipe having a rectangular cross-section, and a rear end surface 82a of the longitudinal member 82 is tilted at a predetermined angle θ (e.g., approximately 45 degrees in this embodiment) with respect to a horizontal plane H (FIG. 9B) and oriented rearward and obliquely downward. As shown in FIG. 7, a front end portion of the longitudinal member 82 is coupled integrally to the bent portion 84 by welding, etc., and a connecting element 90 coupled to the connecting element 70 of the second cross member 32 is provided at a rear end portion of the longitudinal member 82. As shown in FIG. 9A, and FIG. 9B, the rear end portion of the longitudinal member 82 is detachably coupled to the second cross member 32 via the connecting element 90 and the connecting element 70.

As shown in FIG. 9A, the connecting element 90 includes a plate-shaped first portion 230 welded to a rear end surface 82a of the longitudinal member 82 and a plate-shaped second portion 232 welded to a lower surface 82b of the longitudinal member 82. A left end portion 230a of the first portion 230 protrudes to the left from a left side surface 82c of the longitudinal member 82, while a right end portion 230b of the first portion 230 protrudes to the right from a right side surface 82d of the longitudinal member 82. As shown in FIG. 9B, holes 90a into which bolts 226 are inserted are formed on the left end portion 230a and the right end portion 230b (FIG. 9A), respectively. The connecting element 90 is formed by bending of a plate material with a uniform thickness. A rear surface U1 (hereinafter "first tilted surface") of the first portion 230 is tilted at a predetermined angle θ (in this embodiment, for example, approximately 45 degrees) with respect to the horizontal plane H and extends downward, like the rear end surface 82a of the longitudinal member 82.

As shown in FIG. 9B, the connecting element 70 includes a plate-shaped first portion 234 welded to an upper portion of the second cross member 32, and a plate-shaped second portion 236 welded to a lower portion of the second cross member 32. A front surface U2 (hereinafter referred to as "second tilted surface") of the first portion 234 is tilted at the above predetermined angle θ (in this embodiment, for example, approximately 45 degrees) with respect to the horizontal plane H and extends upward. The first portion 234 has holes 70a communicating with the holes 90a formed in the first portion 230 of the connecting element 90. The bolt 226, which is a "fastening member", is inserted into each of the holes 90a of the connecting element 90 and into each of the holes 70a of the connecting element 70, and a nut 238, which is a "fastening member", is threadingly engaged with the bolt 226.

As shown in FIG. 7, the leg elements 200a and 200b are rod members for supporting the first cross member 80. An upper end portion of the leg element 200a is coupled integrally to the first portion 202 of the first cross member 80 by welding or the like, while an upper end portion of the leg element 200b is coupled integrally to the second portion 204 of the first cross member 80 by welding or the like. The leg elements 200a and 200b are provided with connecting portions 242 having holes 242a into which bolts 240 are inserted, respectively. The connecting portions 242 are detachably coupled to an upper surface of the floor member 28 (FIG. 5) using bolts 240, and others.

As shown in FIG. 4, the cabin frame (ROPS) 26 includes a pair of right and left side members 92 coupled to the pair of right and left side members 30, respectively, and a plurality of cross members 94 for coupling the side members 92 to each other. Each side member 92 includes a side pipe element 96 positioned opposite to the side pipe element 60 of the main frame 22, a first upper pillar pipe element 98a extending downward from a front end portion of the side pipe element 96, a second upper pillar pipe element 98b extending downward from a center portion of the side pipe element 96 in the forward and rearward direction, and a third upper pillar pipe element 98c extending downward from a rear end portion of the side pipe element 96. Connecting portions 100 are provided at lower end portions of the upper pillar pipe elements 98a to 98c, respectively. The connecting portions 100 are connected to the connecting portions 64 of the side members 30, respectively, by bolts and the like.

As shown in FIGS. 1 and 2, each of the seats S1 to S4 includes the seat frame 14, the seat bottom 16, and the seat backrest 18. In this embodiment, the seat frames 14 of the left seats S1 and S3 have substantially the same structure, while the seat frames 14 of the right seats S2 and S4 have substantially the same structure. The seat frame 14 of the left seat S1 and the seat frame 14 of the right seat S2 are substantially symmetric in the rightward and leftward direction, while the seat frame 14 of the left seat S3 and the seat frame 14 of the right seat S4 are substantially symmetric in the rightward and leftward direction. The seat bottoms 16 of the seats S1 to S4 have the same structure and the seat backrests 18 of the seats S1 to S4 have the same structure. Hereinafter, the seat frame 14, the seat bottom 16 and the seat backrest 18 of the seat S1 will be described, by way of example. The seats S2, S3, and S4 will not be described specifically.

Figure 10:
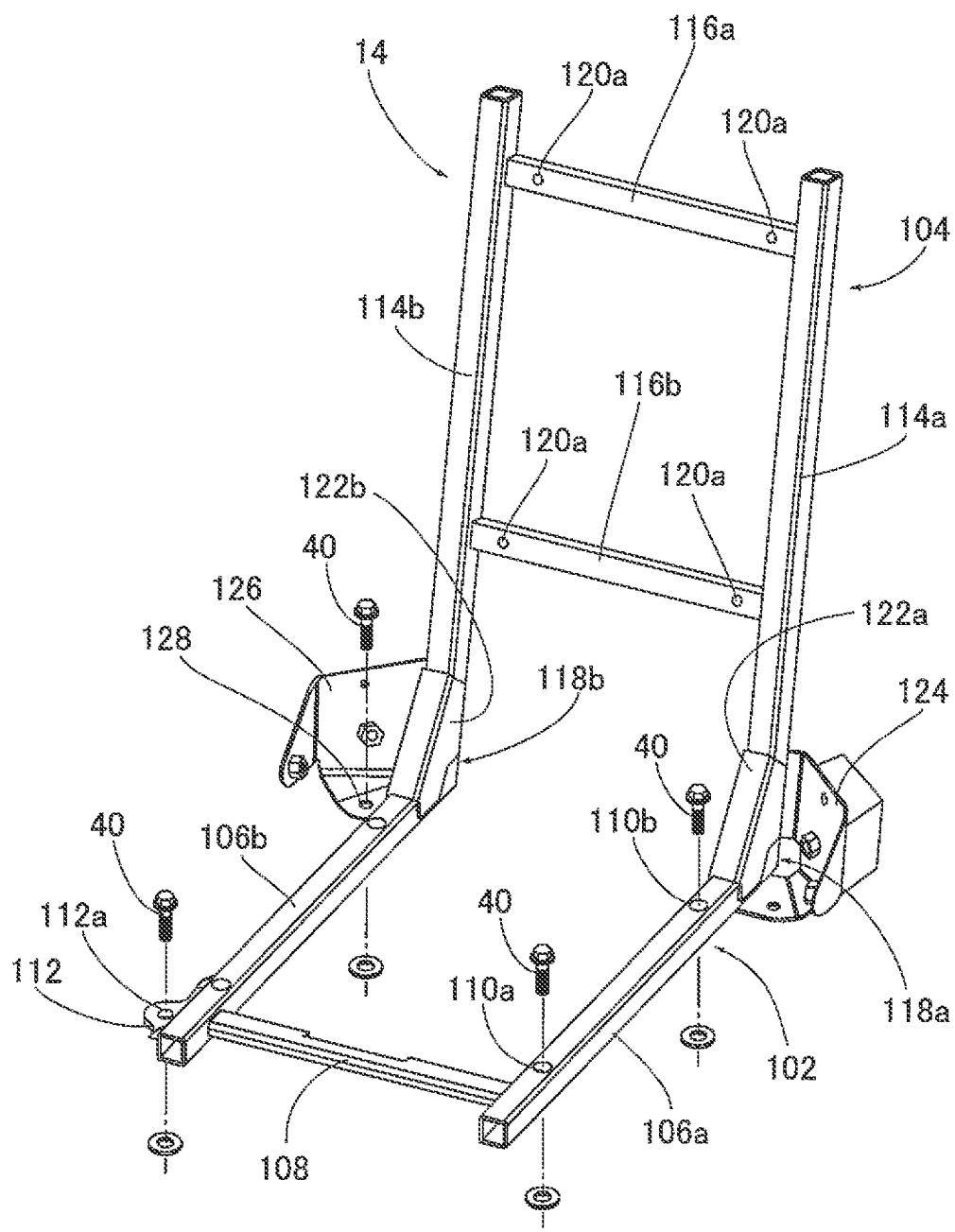
FIG. 10 is a perspective view showing a configuration of a seat frame.

FIG. 10 is a perspective view showing a configuration of the seat frame 14. The seat frame 14 includes a seat bottom support member 102 for supporting the seat bottom 16 and a seat backrest support member 104 for supporting the seat backrest 18.

As shown in FIG. 10, the seat bottom support member 102 includes two support pipes 106a and 106b arranged to extend in the forward and rearward direction in parallel with each other, and a coupling pipe 108 for coupling the two support pipes 106a and 106b to each other. The support pipes 106a and 106b are square pipes having rectangular cross-sections. As shown in FIG. 3, the support pipes 106a and 106b are designed to have a length greater than a distance between the support pipe 38 of the main frame 22 and the first cross member 80 of the sub-frame 24. As shown in FIG. 10, the support pipe 106a is provided with holes 110a and 110b, which are spaced apart from each other in the forward and rearward direction. Bolts 40 are inserted into the holes 110a and 110b, respectively. A plate 112 is attached to an outer side surface of a front end portion of the support pipe 106b, and has a hole 112a into which the bolt 40 is inserted. The coupling pipe 108 is a square pipe having a rectangular cross-section. One end portion of the coupling pipe 108 is welded to a front end portion of the support pipe 106a, while an opposite end portion thereof is welded to a front end portion of the support pipe 106b.

Figure 14:
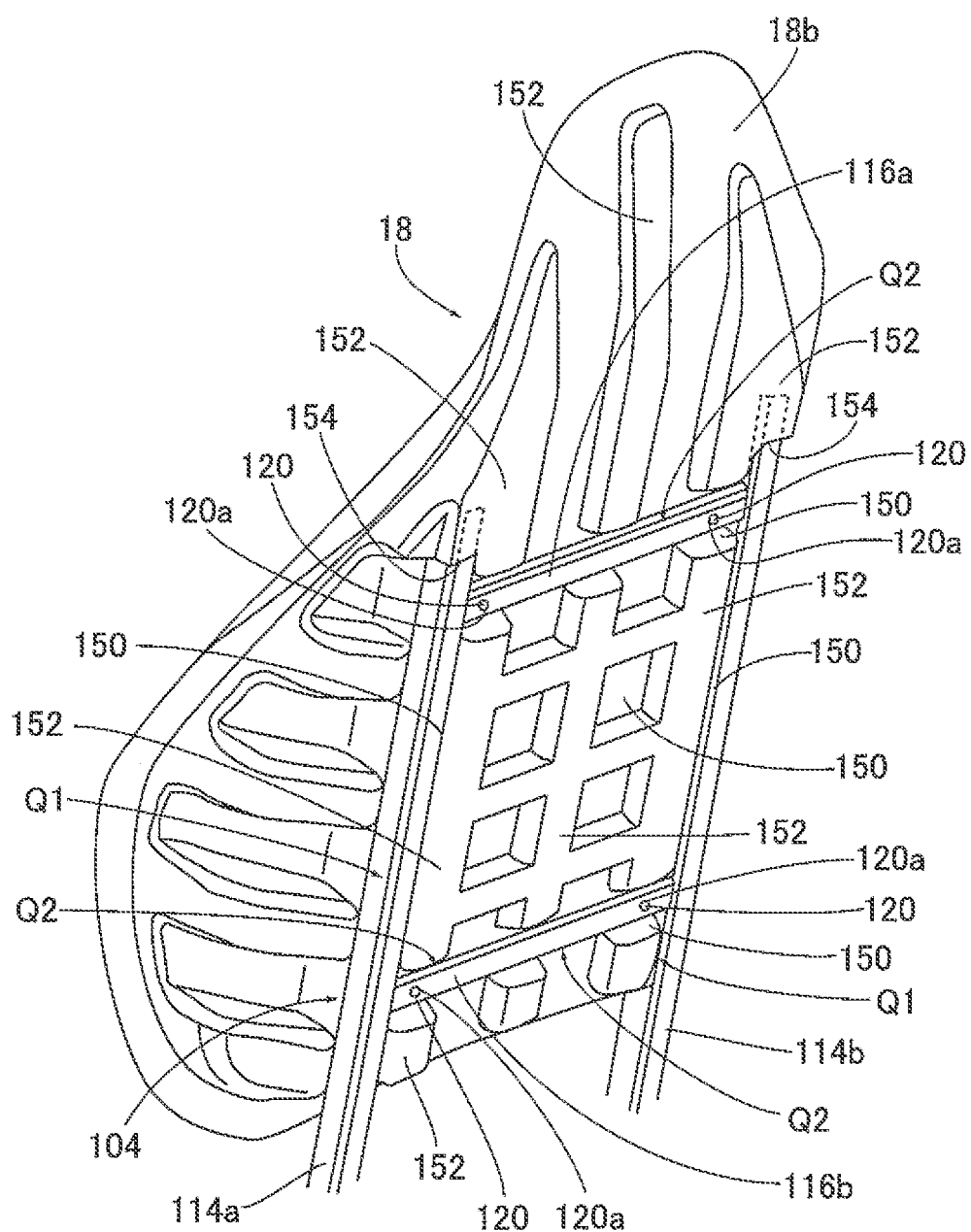
FIG. 14 is a perspective view showing a state where a seat backrest is fastened to the seat frame.

As shown in FIG. 10, the seat backrest support member 104 includes two support pipes 114a and 114b arranged to extend vertically in parallel with each other, and two coupling pipes 116a and 116b for coupling the two support pipes 114a and 114b to each other. The support pipes 114a and 114b are square pipes having rectangular cross-sections. The support pipe 114a is connected to the support pipe 106a of the seat bottom support member 102 via a bent portion 118a, while the support pipe 114b is connected to the support pipe 106b of the seat bottom support member 102 via a bent portion 118b. Each of the two coupling pipes 116a and 116b is a square pipe having a rectangular cross-section. One end portion of each of the coupling pipes 116a and 116b is welded to the support pipe 114a, while an opposite end portion of each of the coupling pipes 116a and 116b is welded to the support pipe 114b. As shown in FIG. 14, the positions of the two coupling pipes 116a and 116b are designed according to a shape of the seat backrest 18. In this embodiment, the coupling pipe 116a is located slightly above a vertical center portion of the seat backrest 18, while the coupling pipe 116b is located at a lower portion of the seat backrest 18. Each of the two coupling pipes 116a and 116b has holes 120a into which bolts 120 are inserted, respectively.

As shown in FIG. 10, at the bent portion 118a or in the vicinity of the bent portion 118a, a metal-made reinforcement plate 122a for reinforcing the bent portion 118a and a seat belt accommodating portion 124 for accommodating a seat belt (not shown) are fastened to the support pipe 106a of the seat bottom support member 102 and the support pipe 114a of the seat backrest support member 104. In this embodiment, the seat belt accommodating portion 124 is a retractor which winds back the seat belt. At the bent portion 118b or in the vicinity of the bent portion 118b, a metal-made reinforcement plate 122b for reinforcing the bent portion 118b and a seat belt fastening portion 126 for fastening the seat belt are fastened to the support pipe 106b of the seat bottom support member 102 and the support pipe 114b of the seat backrest support member 104. The reinforcement plate 122b has a hole 128 into which the bolt 40 is inserted.

Figure 11:
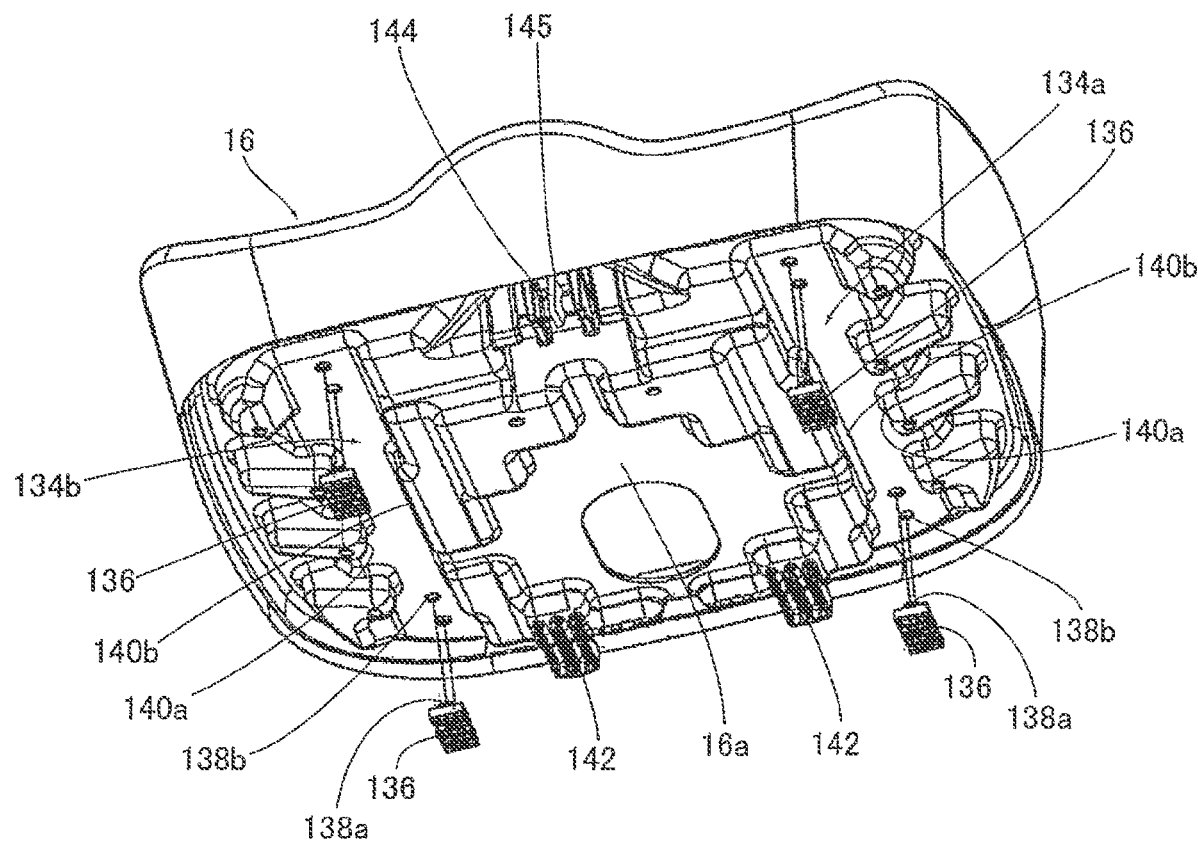
FIG. 11 is a perspective view showing a configuration of a seat bottom, as viewed obliquely from below.

FIG. 11 is a perspective view showing a configuration of the seat bottom 16 as viewed obliquely from below. The seat bottom 16 is formed unitarily using synthetic resin. An upper surface of the seat bottom 16 has a shape in which side portions in the rightward and leftward direction are higher than a center portion in the rightward and leftward direction to allow the passenger to be seated thereon comfortably. As shown in FIG. 11, grooves 134a and 134b are formed on portions of a lower surface 16a of the seat bottom 16, which face an upper surface of the seat bottom support member 102 (FIG. 10), and extend in the forward and rearward direction. The grooves 134a and 134b are configured to accommodate the support pipes 106a and 106b (FIG. 10), respectively. At least one rubber-made damper 136 (in this embodiment, two) is provided on the bottom surface of each of the grooves 134a and 134b such that the rubber-made dampers 136 are spaced apart from each other in the forward and rearward direction. Protrusions 138a are formed on the upper surfaces of the rubber-made dampers 136, respectively. Holes 138b are formed on the bottom surfaces of the grooves 134a and 134b, respectively. The protrusions 138a are fitted into the holes 138b, respectively. On the inner side surfaces of the grooves 134a and 134b, there are formed opposite surfaces 140a and 140b which are opposite to the side surfaces of the support pipes 106a and 106b (FIG. 10) of the seat frame 14 (FIG. 10), in the rightward and leftward direction.

As shown in FIG. 11, two second engagement mechanisms 142 are provided on the lower surface 16a of a rear portion of the seat bottom 16 such that they are spaced apart from each other in the rightward and leftward direction. The second engagement mechanisms 142 are engaged with the first cross member 80 (FIG. 5) from below. In addition, a first engagement mechanism 144 and a disengagement mechanism 145 are provided on the lower surface 16a of a front portion of the seat bottom 16. The first engagement mechanism 144 is engaged with the coupling pipe 108 (FIG. 10) of the seat frame 14 (FIG. 10) from below. The disengagement mechanism 145 is configured to disengage the first engagement mechanism 144, as desired.

As shown in FIG. 3, the second engagement mechanism 142 includes a first portion 142a, protruding downward from the lower surface 16a of the seat bottom 16, and a second portion 142b, protruding rearward from a lower end portion of the first portion 142a. When the seat bottom 16 is mounted to the seat bottom support member 102 of the seat frame 14, the second engagement mechanism 142, of a substantially L-shape formed by the first portion 142a and the second portion 142b, is pressed against the first cross member 80 from forward of the cross member 80.

Figure 12:
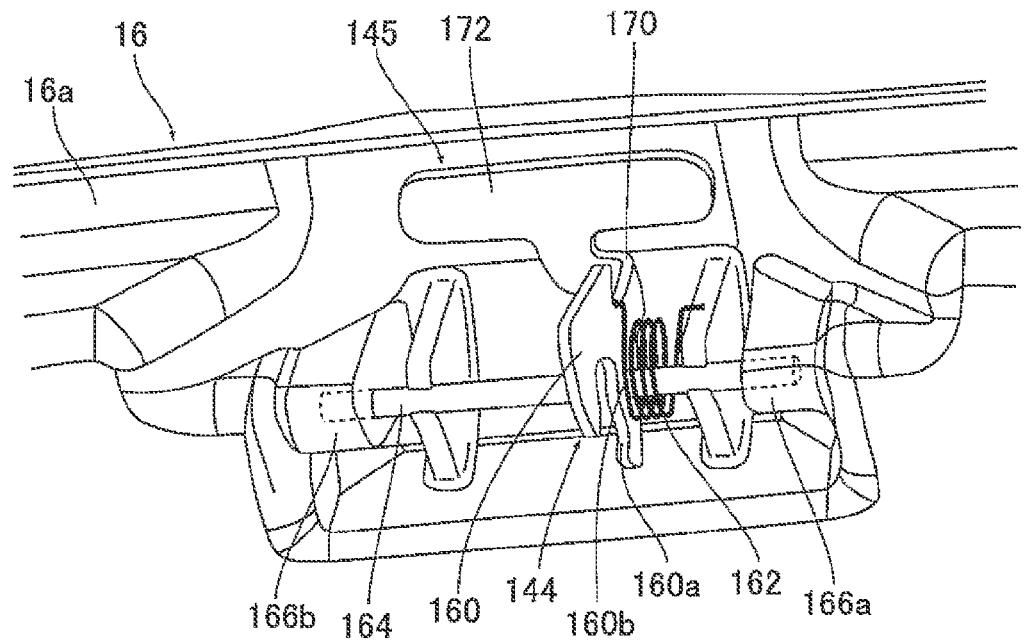
FIG. 12 is an enlarged perspective view showing a first engagement mechanism and a disengagement mechanism provided at the seat bottom, as viewed obliquely from below.
Figure 13:
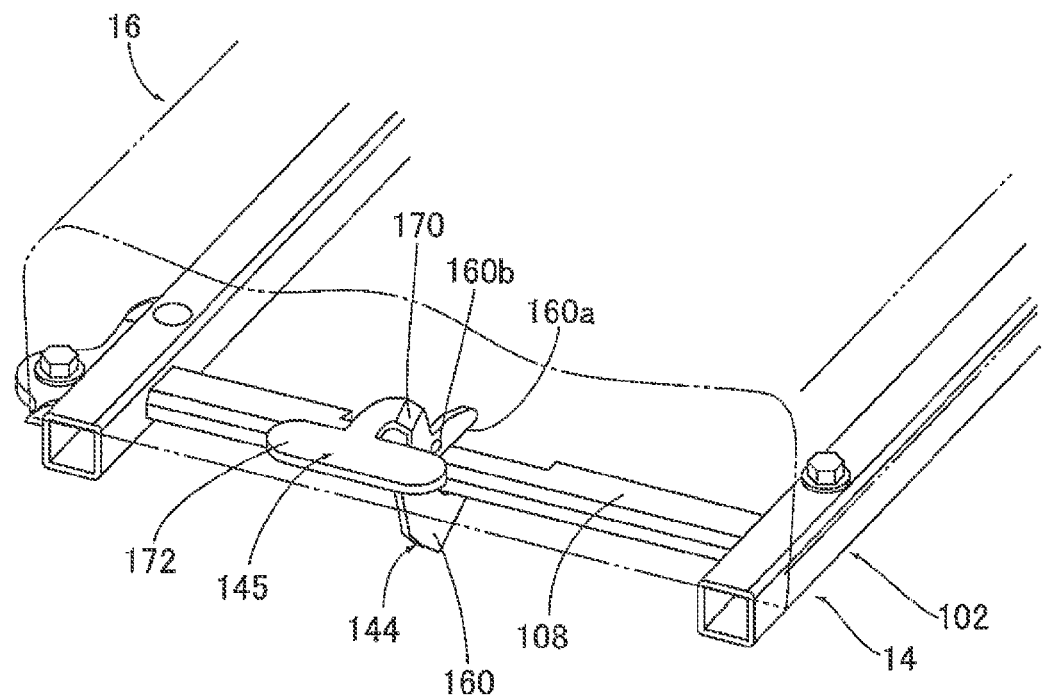
FIG. 13 is a perspective view showing a state where the first engagement mechanism is engaged with the seat frame.

FIG. 12 is an enlarged perspective view showing the first engagement mechanism 144 and the disengagement mechanism 145, which are provided on the front end portion of the lower surface 16a of the seat bottom 16, as viewed obliquely from below. FIG. 13 is a perspective view showing a state where the first engagement mechanism 144 is engaged with the seat frame 14. As shown in FIG. 12, the first engagement mechanism 144 includes an engagement plate 160 engaged with the coupling pipe 108 (FIG. 13) of the seat frame 14 from below, a coil spring 162 configured to bias the engagement plate 160 in one direction, a support shaft 164 configured to rotatably support the engagement plate 160 and the coil spring 162, and two bearings 166a and 166b formed integrally with the seat bottom 16. The engagement plate 160 is a plate-shaped member having a substantially-U-shaped recess 160a. The engagement plate 160 is provided with a through-hole 160b into which the support shaft 164 is inserted. The support shaft 164 is inserted into the through-hole 160b of the engagement plate 160 and into a hollow space of the coil spring 162. Both end portions of the support shaft 164 are supported by the bearings 166a and 166b. One end portion of the coil spring 162 is engaged with the engagement plate 160, while an opposite end portion thereof is engaged with the seat bottom 16. The coil spring 162 biases an opening of the recess 160a provided on the engagement plate 160 to orient it in a rearward direction.

As shown in FIGS. 12 and 13, the disengagement mechanism 145 is configured to disengage the first engagement mechanism 144 from the coupling pipe 108, which mounts the seat bottom 16 to the seat bottom support member 102, or to disengage the seat bottom 16 from the seat bottom support member 102. The disengagement mechanism 145 is integral with the first engagement mechanism 144. As shown in FIG. 13, the disengagement mechanism 145 includes an arm 170 extending forward and obliquely upward from a region of the engagement plate 160 in the vicinity of the hole 160b, and an operation portion 172 provided at a front end portion of the arm 170, in a state where the first engagement mechanism 144 is engaged. The operation portion 172 is operated by the operator's fingers. In this embodiment, the operation portion 172 has a plate shape extending in the rightward and leftward direction. When the operator lifts the operation portion 172 while holding a lower surface of the operation portion 172 with the fingers, the resulting force is transmitted to the engagement plate 160 via the arm 170. Thereupon, the engagement plate 160 is rotated against a biasing force applied by the coil spring 162 (FIG. 12), and the opening of the recess 160a is oriented in a downward direction, thereby disengaging the first engagement mechanism 144 from the coupling pipe 108. Therefore, as shown in FIG. 13, by merely lifting the operation portion 172, in a state where the seat bottom 16 is mounted to the seat bottom support member 102, the seat bottom 16 can be detached from the seat bottom support member 102.

FIG. 14 is a perspective view showing a state where the seat backrest 18 is fastened to the seat frame 14. As shown in FIG. 14, a back surface 18b of the seat backrest 18 has a plurality of recesses 150 and a plurality of convex portions 152. The recesses 150 are vertically continuous to form first accommodating spaces Q1 on the back surface 18b to correspond to the support pipes 114a and 114b, respectively. The recesses 150 are continuous in the rightward and leftward direction to form second accommodating spaces Q2 on the back surface 18b to correspond to the coupling pipes 116a and 116b, respectively. Holes 154 are formed on lower surfaces of the convex portions 152, provided above the first accommodating spaces Q1, to communicate with the first accommodating spaces Q1, respectively. Tip end portions of the support pipes 114a and 114b accommodated in the first accommodating spaces Q1 are inserted into the convex portions 152 through the holes 154, respectively. Then, the seat backrest 18 is fastened to the seat backrest support member 104 using the bolts 120 inserted into the holes 120a provided on the coupling pipes 116a and 116b, and the like.

As shown in FIG. 3, when the seat S1 is mounted to the vehicle body frame 12, firstly, the front portions of the two support pipes 106a and 106b of the seat frame 14 are supported on the support pipes 38 of the main frame 22, and their rear end portions are placed on the first cross member 80 of the sub-frame 24. Then, as shown in FIG. 10, the four bolts 40 are inserted into the holes 110a, 110b, 112a and 128 of the seat frame 14 and into the holes 42a, 88a, 42a and 88a (FIG. 5) of the vehicle body frame 12 (FIG. 3), and the seat frame 14 is fastened to the vehicle body frame 12 (FIG. 3) using these bolts 40. Then, as shown in FIG. 3, the seat bottom 16 is fastened to the first cross member 80 and to the seat frame 14 by the first engagement mechanism 144 and the second engagement mechanisms 142. Then, as shown in FIG. 11, the seat backrest 18 is fastened to the seat frame 14 using the bolts 120. The seats S2, S3, and S4 are mounted to the vehicle body frame 12 in the same manner.

As shown in FIG. 1, in this embodiment, the front seats S1 and S2 are arranged behind the first lower pillar pipe element 62a in a forefront location in the main frame 22 and forward relative to the second lower pillar pipe element 62b in a middle location in the main frame 22, while the rear seats S3 and S4 are arranged behind the second lower pillar pipe element 62b in the middle location in the main frame 22 and forward relative to the third lower pillar pipe element 62c in a rearmost location in the main frame 22. As shown in FIG. 6, rear portions of the front seats S1, S2, and are mounted to the first cross member 80 of the sub-frame 24.

As shown in FIG. 5, the engine E is positioned such that its center of gravity is behind the first lower pillar pipe element 62a in the forefront location and forward relative to the second lower pillar pipe element 62b in the middle location. As shown in FIG. 6, in a state where the front seats S1 and S2 are mounted to the vehicle body frame 12, the engine E is covered with the seat bottom 16 constituting the seat S1, the seat bottom 16 constituting the seat S2, and the console box 56. In other words, an upper wall surface 174 of the engine room R is defined by at least a portion of the lower surface 16a of the seat bottom 16 constituting the left seat S1, a lower surface 56a of the console box 56, and at least a portion of the lower surface 16a of the seat bottom 16 constituting the right seat S2.

Figure 15:
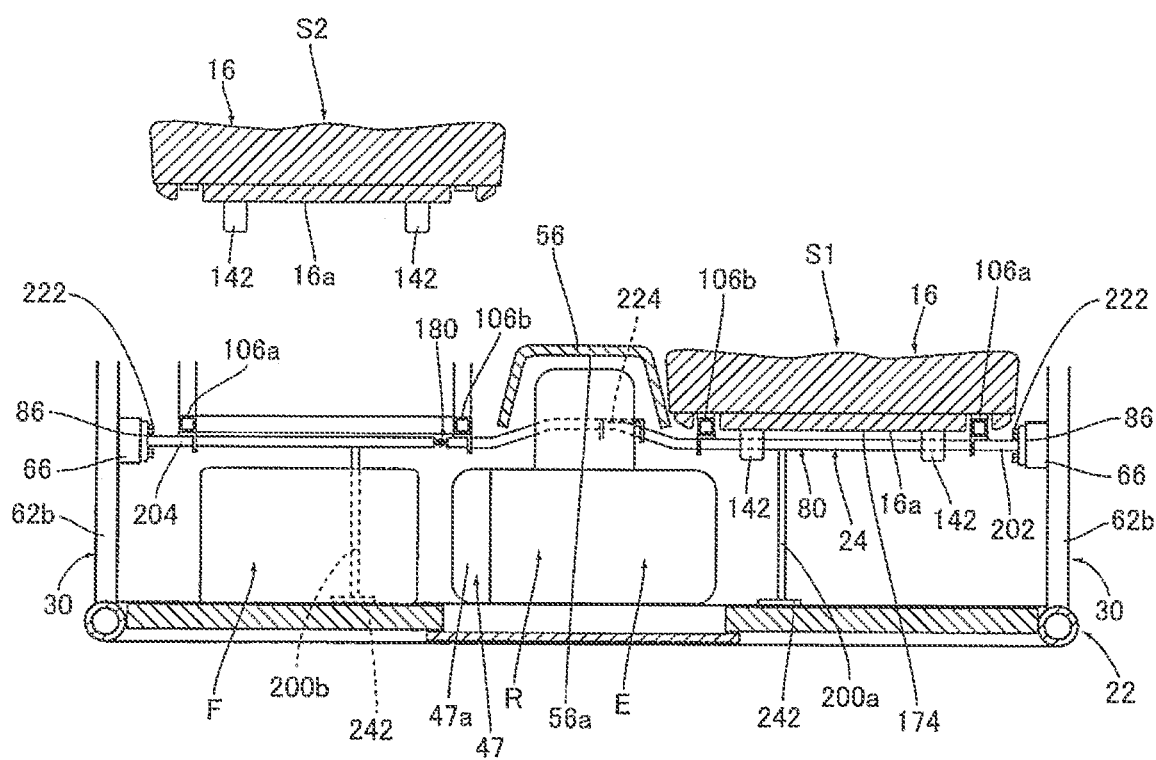
FIG. 15 is a cross-sectional view showing a step of detaching a right seat, corresponding to FIG. 6.
Figure 16:
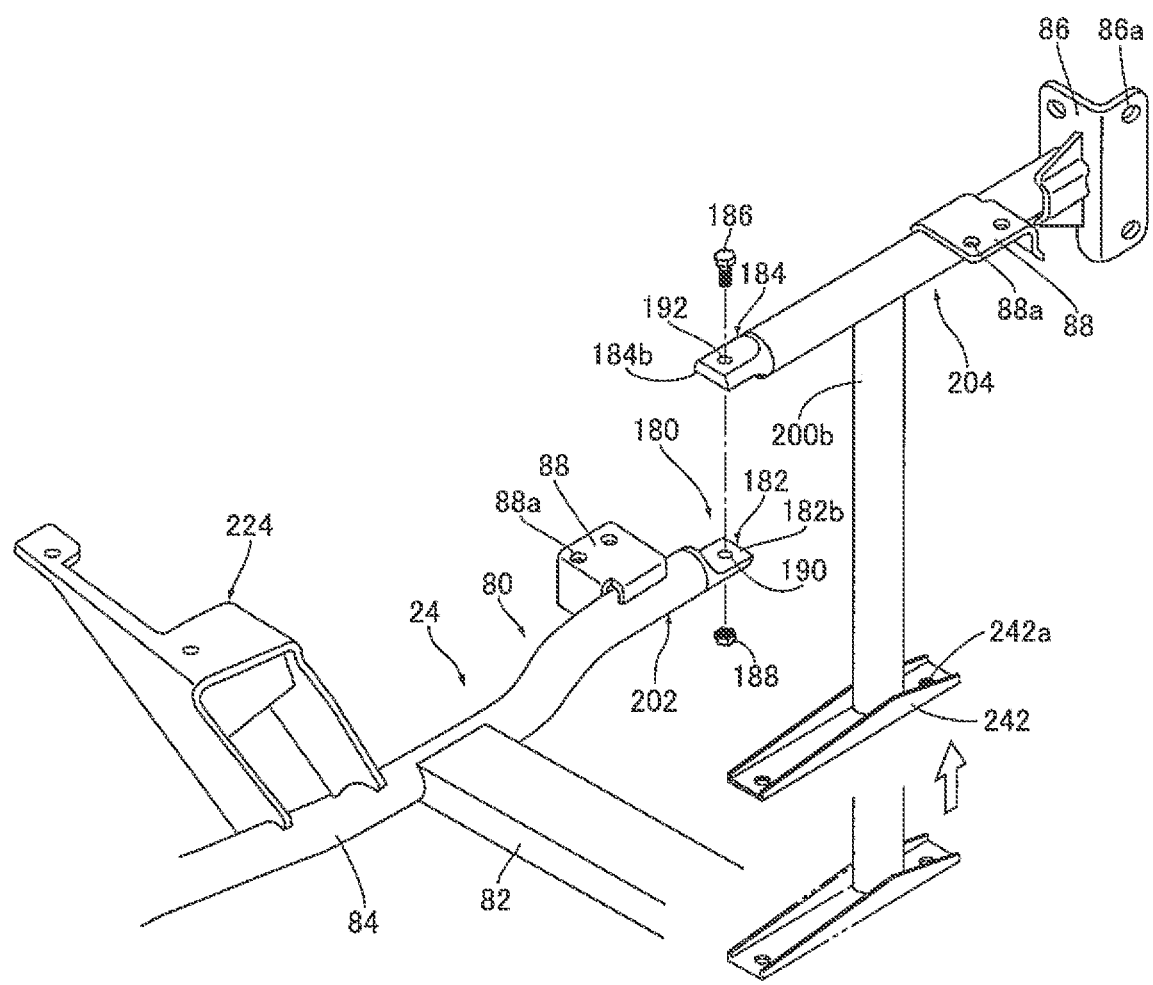
FIG. 16 is a perspective view showing a method of separating components of the sub-frame.
Figure 17:
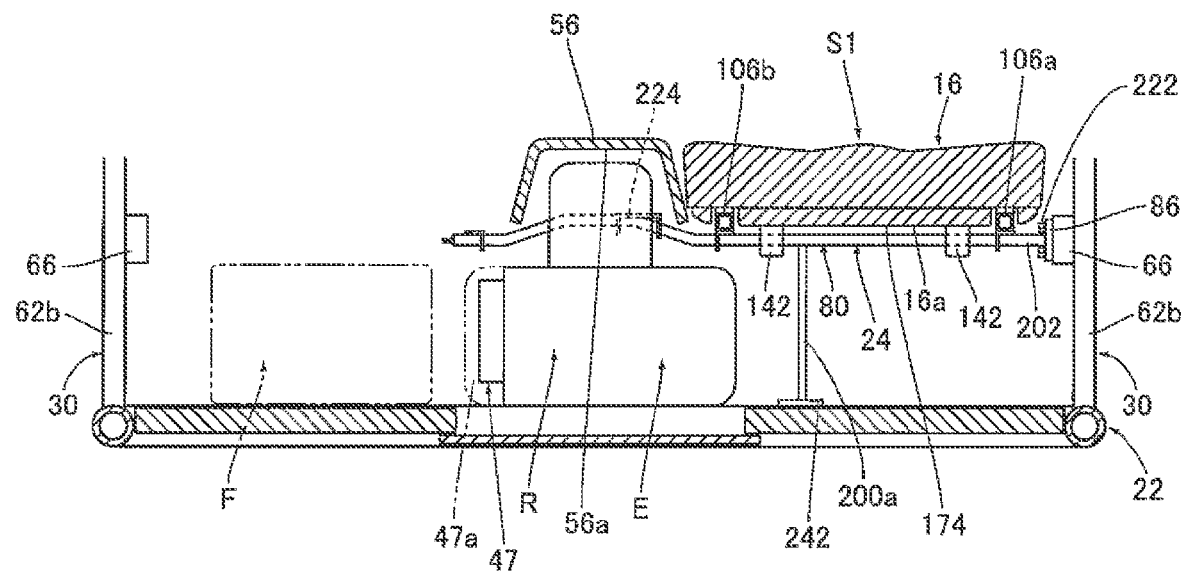
FIG. 17 is a cross-sectional view showing a state where a cover of a CVT is detached, corresponding to FIG. 6.

When a tension of a belt of the CVT 47 is adjusted in the utility vehicle 10, initially, as shown in FIG. 15, the seat S2 is detached from the vehicle body frame 12. Following this, as shown in FIG. 16, the second portion 204 of the first cross member 80 constituting the sub-frame 24 is separated from the first portion 202 of the first cross member 80, and the second portion 204, the leg element 200b, the connecting portion 242 and the connecting portion 86 are detached from the main frame 22 (FIG. 15). Then, as shown in FIG. 17, the fuel tank F is detached and the cover 47a of the CVT 47 is detached. Then, a tension of the belt of the CVT 47 is adjusted through a space formed laterally relative to the engine E.

When the overall engine E is dismounted from the vehicle body frame 12 for maintenance, the seats S1 and S2, the console box 56, the sub-frame 24, and the fuel tank F are detached from the main frame 22 (FIG. 15), and then the overall engine E is dismounted from the vehicle body frame 12.

In Embodiment 1, the bolts 222 (FIG. 7) of the connecting portion 86 and the bolts 240 (FIG. 7) of the connecting portion 242 are removed, and the bolt 186 and the nut 188 (FIG. 8) of the joint portion 180 are loosened, thereby separating the second portion 204 of the sub-frame 24 from the first portion 202. By removing the bolts 222 (FIG. 7) of the connecting portion 86, the bolts 226 (FIGS. 9A, 9B) of the connecting element 90, and the bolts 240 (FIG. 7) of the connecting portion 242, the overall sub-frame 24 can be easily detached from the main frame 22.

As shown in FIG. 9B, in Embodiment 1, since the first tilted surface U1 of the connecting element 90 is tilted at the predetermined angle θ with respect to the horizontal plane H and is oriented rearward and obliquely downward, and the second tilted surface U2 of the connecting element 70 is tilted at the predetermined angle θ with respect to the horizontal plane H and is oriented forward and obliquely upward, the first tilted surface U1 and the second tilted surface U2 can receive forces applied in the forward and rearward direction, and in the vertical direction, between the connecting element 90 and the connecting element 70. Therefore, it is possible to prevent these forces from acting on localized regions of the connecting element 90 and the connecting element 70 and hence to firmly couple the connecting element 90 and the connecting element 70 to each other.

Figure 18:
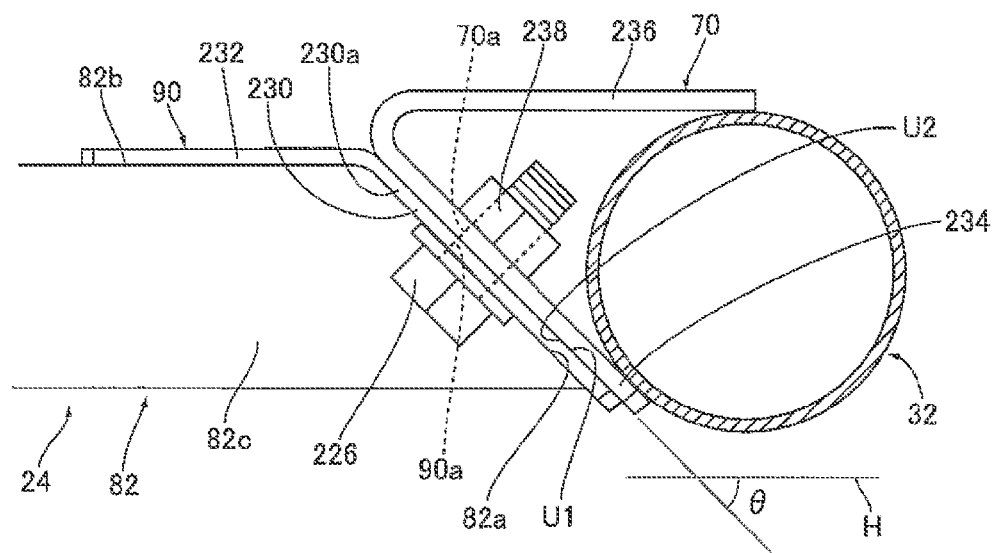
FIG. 18 is a left side view showing a coupling structure for coupling the longitudinal member of the sub-frame to a second cross member of the main frame, according to Embodiment 2.

FIG. 18 is a left side view showing a coupling structure for coupling the longitudinal member 82 of the sub-frame 24 to the second cross member 32 of the main frame, in a utility vehicle according to Embodiment 2. In Embodiment 2, the first tilted surface U1 of the connecting element 90 is oriented rearward and obliquely upward and the second tilted surface U2 of the connecting element 70 is oriented forward and obliquely downward. In Embodiment 2, the first tilted surface U1 and the second tilted surface U2 can also receive forces applied in the forward and rearward direction and in the vertical direction, between the connecting element 90 and the connecting element 70. Therefore, as in Embodiment 1, the forces applied to the localized regions of the connecting elements 70 and 90 can be reduced.

Figure 19:
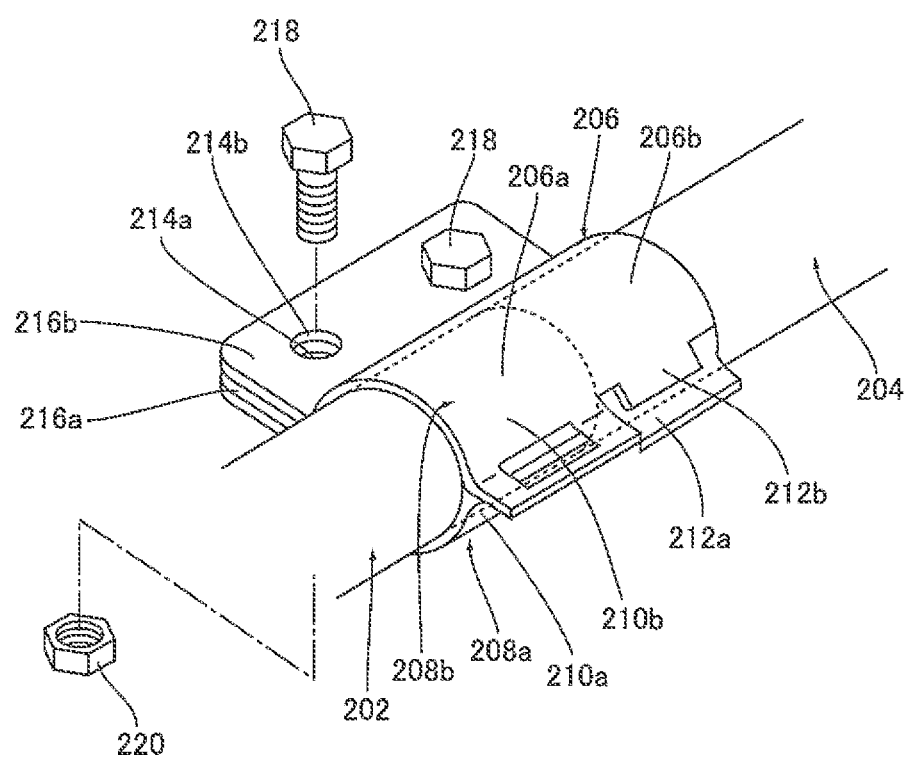
FIG. 19 is a perspective view showing a configuration of a joint member of a sub-frame according to Embodiment 3.

FIG. 19 is a perspective view showing a configuration of a joint member 206 of the sub-frame 24 according to Embodiment 3. As shown in FIG. 19, the joint member 206 has a substantially cylindrical shape formed by joining a first portion 208a and a second portion 208b to each other. The first portion 208a has a first contact portion 210a of a substantially semi-cylindrical shape, which contacts an outer surface of the first portion 202 and an outer surface of the second portion 204. A first engagement portion 212a is formed at one end portion of the first contact portion 210a in a circumferential direction, while a first fastening portion 216a having two holes 214a is formed at an opposite end portion of the first contact portion 210a in the circumferential direction, to extend radially. The second portion 208b has a second contact portion 210b of a substantially semi-cylindrical shape, which contacts the outer surface of the first portion 202 and the outer surface of the second portion 204. A second engagement portion 212b is formed at one end portion of the second contact portion 210b in the circumferential direction, while a second fastening portion 216b having two holes 214b is formed at an opposite end portion of the second contact portion 210b in the circumferential direction, to extend radially. The first engagement portion 212a and the second engagement portion 212b are engaged with each other and the first fastening portion 216a and the second fastening portion 216b face each other such that they are spaced a predetermined distance from each other. A bolt 218 is inserted into the hole 214a of the first fastening portion 216a and into the hole 214b of the second fastening portion 216b, and a nut 220 is threadingly engaged with the bolt 218.

As shown in FIG. 19, when the first portion 202 is coupled to the second portion 204 using the joint member 206, an end portion of the first portion 202 is inserted into one receiver 206a of the joint member 206, and an end portion of the second portion 204 is inserted into a receiver 206b of the joint member 206. By tightening the bolt 218 and the nut 220 together, the first fastening portion 216a and the second fastening portion 216b are fastened together. When the first portion 202 and the second portion 204 are separated from each other, the bolt 218 and the nut 220 (FIG. 19) are loosened, and thereby the first fastening portion 216a and the second fastening portion 216b are unfastened.

As shown in FIG. 9B, in Embodiment 1, the connecting element 90 and the connecting element 70 are fastened to each other using the bolts 226 and the nuts 238. In another embodiment, the connecting element 90 and the connecting element 70 may be fastened together by other fastener members, such as fastening pins.

Although the four seats S1 to S4 are arranged at the front and rear sides and at the right and left sides in the above embodiment, as shown in FIG. 1, the number and arrangement of the seats may be suitably changed as desired. For example, only the seats S1 and S2 may be arranged at the right and left sides, or otherwise only the seats S1 and S3 may be arranged at the front and rear sides in a two-seated utility vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame including a main frame including a floor member, which receives a load of an engine, a pair of right and left side members provided integrally at both side portions of the floor member in a rightward and leftward direction, and a sub-frame for reinforcing the main frame;
each of the pair of side members including a side pipe element extending in a forward and rearward direction at a side portion of the floor member in the rightward and leftward direction, a first pillar pipe element, a second pillar pipe element, and a third pillar element, the first pillar pipe element, the second pillar pipe element, and the third pillar element extending upward from the side pipe element such that the first pillar pipe element, the second pillar pipe element, and the third pillar element are spaced apart from each other in the forward and rearward direction;
the sub-frame including a first cross member provided between and coupled to the second pillar pipe element in a middle location in each of the pair of side members such that the first cross member extends continuously in the rightward and leftward direction;
one end portion of the first cross member being detachably coupled to one of the second pillar pipe elements, and an opposite end portion of the first cross member being detachably coupled to the other of the second pillar pipe elements; and
a center portion of the first cross member extending in the rightward and leftward direction is positioned above the engine.

2. The utility vehicle according to claim 1,
wherein the engine is positioned such that its center of gravity is behind the first pillar pipe element in a forefront location and forward relative to the second pillar pipe element in the middle location.

3. The utility vehicle according to claim 1,
wherein the first cross member has a first portion and a second portion which are separably coupled to each other.

4. The utility vehicle according to claim 3,
wherein the sub-frame includes a first leg element supporting the first portion and a second leg element supporting the second portion;

an upper end portion of the first leg element is integrally coupled to the first portion and a lower end portion of the first leg element is detachably coupled to the floor member; and an upper end portion of the second leg element is integrally coupled to the second portion and a lower end portion of the second leg element is detachably coupled to the floor member.

5. The utility vehicle according to claim 1,
wherein a front seat is provided behind the first pillar pipe element in a forefront location in the main frame, and is forward relative to the second pillar pipe element in the middle location;
a rear seat is provided behind the second pillar pipe element in the middle location in the main frame and forward relative to the third pillar pipe element in a rearmost location; and
a rear portion of the front seat is mounted to the first cross member of the sub-frame.

6. The utility vehicle according to claim 1,
wherein the main frame includes a second cross member provided between and coupled to the third pillar pipe element of each of the pair of side members; and
the sub-frame includes a longitudinal member having a front end portion integrally coupled to the first cross member and a rear end portion detachably coupled to the second cross member.

7. A utility vehicle comprising:
a vehicle body frame including a main frame including a floor member, which receives a load of an engine, a pair of right and left side members provided integrally at both side portions of the floor member in a rightward and leftward direction, and a sub-frame for reinforcing the main frame;
each of the pair of side members including a side pipe element extending in a forward and rearward direction at a side portion of the floor member in the rightward and leftward direction, a first pillar pipe element, a second pillar pipe element, and a third pillar element, the first pillar pipe element, the second pillar pipe element, and the third pillar element extending upward from the side pipe element such that the first pillar pipe element, the second pillar pipe element, and the third pillar element are spaced apart from each other in the forward and rearward direction;
the sub-frame including a first cross member provided between and coupled to the second pillar pipe element in a middle location in each of the pair of side members;
one end portion of the first cross member being detachably coupled to one of the second pillar pipe elements, and an opposite end portion of the first cross member being detachably coupled to the other of the second pillar pipe elements;
the main frame including a second cross member provided between and coupled to the third pillar pipe element of each of the pair of side members;
the sub-frame including a longitudinal member having a front end portion integrally coupled to the first cross member and a rear end portion detachably coupled to the second cross member;
wherein a first connecting element having a first tilted surface oriented obliquely downward or obliquely upward in a rearward direction such that the first tilted surface is tilted at a predetermined angle with respect to a horizontal plane is provided at the rear end portion of the longitudinal member;

a second connecting element having a second tilted surface oriented obliquely upward or obliquely downward in a forward direction such that the second tilted surface is tilted at the predetermined angle with respect to the horizontal plane is provided at the second cross member; and
the first connecting element and the second connecting element are fastened together by a fastener member in a state where the first tilted surface and the second tilted surface are in contact with each other.

8. A utility vehicle comprising:
a vehicle body frame including a main frame including a floor member, which receives a load of an engine, a pair of right and left side members provided integrally at both side portions of the floor member in a rightward and leftward direction, and a sub-frame for reinforcing the main frame;
each of the pair of side members including a side pipe element extending in a forward and rearward direction at a side portion of the floor member in the rightward and leftward direction, a first pillar pipe element, a second pillar pipe element, and a third pillar element, the first pillar pipe element, the second pillar pipe element, and the third pillar element extending upward from the side pipe element such that the first pillar pipe element, the second pillar pipe element, and the third pillar element are spaced apart from each other in the forward and rearward direction;
the sub-frame including a first cross member provided between and coupled to the second pillar pipe element in a middle location in each of the pair of side members; and
one end portion of the first cross member being detachably coupled to one of the second pillar pipe elements, and an opposite end portion of the first cross member being detachably coupled to the other of the second pillar pipe elements;
wherein a bent portion is provided at the first cross member in a location above the engine such that the bent portion is bent away from the engine.

9. A utility vehicle comprising:
a vehicle body frame including a main frame including a floor member, which receives a load of an engine, a pair of right and left side members provided integrally at both side portions of the floor member in a rightward and leftward direction, and a sub-frame for reinforcing the main frame;
each of the pair of side members including a side pipe element extending in a forward and rearward direction at a side portion of the floor member in the rightward and leftward direction, a first pillar pipe element, a second pillar pipe element, and a third pillar element, the first pillar pipe element, the second pillar pipe element, and the third pillar element extending upward from the side pipe element such that the first pillar pipe element, the second pillar pipe element, and the third pillar element are spaced apart from each other in the forward and rearward direction;
the sub-frame including a first cross member provided between and coupled to the second pillar pipe element in a middle location in each of the pair of side members; and
one end portion of the first cross member being detachably coupled to one of the second pillar pipe elements, and an opposite end portion of the first cross member being detachably coupled to the other of the second pillar pipe elements;

wherein the first cross member is provided with a bracket supporting a lever of a parking brake.

* * * * *